United States Patent
Yoon et al.

(10) Patent No.: US 11,288,768 B2
(45) Date of Patent: *Mar. 29, 2022

(54) APPLICATION PROCESSOR INCLUDING RECONFIGURABLE SCALER AND DEVICES INCLUDING THE PROCESSOR

(71) Applicant: Samsung Electronics Co., Ltd., Suwon-si (KR)

(72) Inventors: Sung Chul Yoon, Hwaseong-si (KR); Ha Na Yang, Gunpo-si (KR)

(73) Assignee: SAMSUNG ELECTRONICS CO., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/009,761

(22) Filed: Sep. 1, 2020

(65) Prior Publication Data

US 2020/0402200 A1 Dec. 24, 2020

Related U.S. Application Data

(63) Continuation of application No. 16/379,775, filed on Apr. 9, 2019, now Pat. No. 10,796,409, which is a continuation of application No. 14/860,701, filed on Sep. 21, 2015, now Pat. No. 10,311,545.

(30) Foreign Application Priority Data

Sep. 22, 2014 (KR) .................. 10-2014-0125793

(51) Int. Cl.
*G09G 5/00* (2006.01)
*G06T 3/40* (2006.01)

(52) U.S. Cl.
CPC .............. *G06T 3/40* (2013.01); *G09G 5/005* (2013.01); *G06T 2200/28* (2013.01); *G09G 2340/0407* (2013.01)

(58) Field of Classification Search
None
See application file for complete search history.

(56) References Cited

U.S. PATENT DOCUMENTS

| | | | |
|---|---|---|---|
| 4,651,341 A | 3/1987 | Nakashima et al. | |
| 5,488,374 A | 1/1996 | Frankot et al. | |
| 5,511,094 A * | 4/1996 | Lee .................... | G06T 9/007 375/241 |
| 5,517,612 A | 5/1996 | Dwin et al. | |
| 5,835,117 A * | 11/1998 | Small ................... | H04N 1/4057 347/183 |
| 5,877,776 A | 3/1999 | Beaman et al. | |
| 5,999,663 A | 12/1999 | Edwards et al. | |
| 6,219,465 B1 | 4/2001 | Nacman et al. | |
| 6,348,929 B1 | 2/2002 | Acharya et al. | |

(Continued)

FOREIGN PATENT DOCUMENTS

CN 104041062 A 9/2014

*Primary Examiner* — Anh-Tuan V Nguyen
(74) *Attorney, Agent, or Firm* — Renaissance IP Law Group LLP

(57) ABSTRACT

An application processor includes a reconfigurable hardware scaler which includes dedicated circuits configured to perform different scaling techniques, respectively and a shared circuit configured to be shared by the dedicated circuits. One of the different scaling techniques is performed by one of the dedicated circuits and the shared circuit.

16 Claims, 13 Drawing Sheets

(56) References Cited

U.S. PATENT DOCUMENTS

| | | |
|---|---|---|
| 6,498,868 B1 | 12/2002 | Klassen |
| 6,556,951 B1 | 4/2003 | Deleo et al. |
| 6,674,800 B1 | 1/2004 | Peng |
| 6,801,219 B2 | 10/2004 | Colavin |
| 7,061,494 B1 | 6/2006 | Whaley |
| 7,428,332 B2 | 9/2008 | Spaulding et al. |
| 7,570,829 B2 | 8/2009 | Ptucha et al. |
| 7,672,539 B2 | 3/2010 | Wang |
| 7,831,804 B2 | 11/2010 | Pappalardo et al. |
| 8,036,494 B2 | 10/2011 | Chen |
| 8,634,673 B1 | 1/2014 | McDougal et al. |
| 2002/0006160 A1* | 1/2002 | Koyama ............ H03H 21/0012 375/232 |
| 2004/0201862 A1 | 10/2004 | Bailey et al. |
| 2004/0201863 A1 | 10/2004 | Bailey et al. |
| 2004/0239813 A1 | 12/2004 | Klompenhouwer |
| 2005/0151885 A1 | 7/2005 | Choi |
| 2005/0285868 A1 | 12/2005 | Obinata |
| 2006/0085768 A1 | 4/2006 | Heng et al. |
| 2006/0170710 A1 | 8/2006 | Chao et al. |
| 2006/0204139 A1 | 9/2006 | Hayashi |
| 2006/0215186 A1 | 9/2006 | Ernst et al. |
| 2006/0274089 A1 | 12/2006 | Zhu et al. |
| 2007/0092162 A1 | 4/2007 | Keithley et al. |
| 2007/0104394 A1 | 5/2007 | Chou |
| 2007/0150623 A1 | 6/2007 | Kravec et al. |
| 2007/0152990 A1 | 7/2007 | Callway |
| 2007/0269113 A1 | 11/2007 | Chao |
| 2008/0043141 A1 | 2/2008 | Namioka |
| 2008/0180451 A1 | 7/2008 | Obinata et al. |
| 2009/0091585 A1 | 4/2009 | Koyanagi |
| 2009/0148059 A1 | 6/2009 | Matsuda |
| 2009/0327893 A1 | 12/2009 | Terry et al. |
| 2010/0002958 A1 | 1/2010 | Wu |
| 2010/0177985 A1 | 7/2010 | Keithley et al. |
| 2010/0232680 A1 | 9/2010 | Kleihorst |
| 2010/0315556 A1 | 12/2010 | Lin et al. |
| 2011/0122299 A1* | 5/2011 | Tatsuzawa ............ H04N 5/367 348/246 |
| 2012/0027313 A1 | 2/2012 | Xu et al. |
| 2012/0050334 A1 | 3/2012 | Velthoven et al. |
| 2012/0057627 A1 | 3/2012 | Chan et al. |
| 2012/0092452 A1* | 4/2012 | Tourapis ................ H04N 19/61 348/43 |
| 2012/0098864 A1 | 4/2012 | Chowdhry et al. |
| 2012/0328020 A1 | 12/2012 | Lou et al. |
| 2013/0162901 A1 | 6/2013 | Thompson |
| 2014/0072029 A1 | 3/2014 | Zhai et al. |
| 2014/0092123 A1 | 4/2014 | Hamada et al. |
| 2015/0356953 A1* | 12/2015 | Modrzyk ............... G09G 5/395 345/531 |

* cited by examiner

| SFR Field | Description |
|---|---|
| SCALE_TECHNIQUE | SCALE TECHNIQUE<br>00 : TECHNIQUE 1<br>01 : TECHNIQUE 2<br>10 : TECHNIQUE 3<br>11 : TECHNIQUE 4 |

130-1

| SFR Field | Description |
|---|---|
| ADAPTIVE_CHANGE | 0 : FIXED TECHNIQUE<br>1 : ADAPTIVE CHANGE |

| Coefficient Calculator | Coefficients |
|---|---|
| 1 | C1~C8 |
| 2 | C1, C3, C5, C7 |
| 3 | C1~C4 |
| 4 | C5~C8 |

APPLICATION PROCESSOR INCLUDING RECONFIGURABLE SCALER AND DEVICES INCLUDING THE PROCESSOR

CROSS-REFERENCE TO RELATED APPLICATIONS

This application is a continuation of U.S. application Ser. No. 16/379,775 filed Apr. 9, 2019, which is a continuation of U.S. patent application Ser. No. 14/860,701, filed on Sep. 21, 2015, which claims priority under 35 U.S.C. § 119(a) from Korean Patent Application No. 10-2014-0125793 filed on Sep. 22, 2014, the disclosure of which is hereby incorporated by reference in its entirety.

BACKGROUND

Generally, a high-definition display (e.g., one that can display ultra high-definition (UHD) images, such as 2160p, 4320p, etc.) of a mobile communication device is supported by a mobile application processor (AP). Often the mobile AP is configured to process, in whole or part, the high-definition image.

Often, a mobile AP includes a scaler configured to convert images or video signals from one display resolution to another. As desired resolutions increase (e.g., from standard to ultra-high definition or beyond), a scale ratio associated with a scaler is increasing. As the scale ratio increases, the quality of the resulting scaled images generally increases.

As a rule, once an integrated circuit (IC) that includes a scaler (designed to perform a particular scaling technique) is manufactured, it is impossible to change the scaler and the technique employed by the scaler to process images. Therefore, a hardware scaler is unable to take advantage of new scaling techniques developed after the ICs initial manufacture.

TECHNICAL FIELD

Embodiments of the disclosed subject matter relate to an integrated circuit (IC), and more particularly, to an application processor including a reconfigurable hardware scaler and devices including the application processor.

SUMMARY

According to some embodiments of the disclosed subject matter, there is provided an application processor including a reconfigurable hardware scaler. The reconfigurable hardware scaler includes dedicated circuits configured to perform different scaling techniques, respectively and a shared circuit configured to be shared by the dedicated circuits. One of the different scaling techniques may be performed by one of the dedicated circuits and the shared circuit.

Each of the dedicated circuits may include first coefficient calculators each configured to generate coefficients corresponding to one of the different scaling techniques. The shared circuit may include a first computation circuit configured to vertically scale first pixels using first coefficients, which are generated by a first coefficient calculator selected from among the first coefficient calculators, and to output vertically scaled pixels. Each of the dedicated circuits may further include second coefficient calculators each configured to generate coefficients corresponding to one of the different scaling techniques. The shared circuit may further include a second computation circuit configured to horizontally scale the vertically scaled pixels using second coefficients, which are generated by a second coefficient calculator selected from among the second coefficient calculators, and to output horizontally scaled pixels.

The shared circuit may further include an analyzer configured to analyze a pattern of second pixels relevant to the first pixels and to generate a selection signal for selecting the first coefficient calculator and the second coefficient calculator according to an analysis result. The second pixels may be pixels corresponding to lines or some of the pixels corresponding to the lines.

The application processor may further include a data storage device configured to store data about the number of pixels to be analyzed. The shared circuit may further include a line memory configured to store the first pixels corresponding to lines. The analyzer may select the first pixels stored in the line memory or some of the first pixels as the second pixels based on the data, analyze the pattern of the second pixels, and generate the selection signal according to the analysis result.

The application processor may further include a data storage device configured to store data about types of the scaling techniques that can be used in the reconfigurable hardware scaler. The analyzer may read the data and generate the selection signal for selecting the first coefficient calculator and the second coefficient calculator based on the data and the analysis result. The application processor may further include a central processing unit (CPU) configured to generate vertical scaling coefficients and horizontal scaling coefficients and a data storage device configured to store the vertical scaling coefficients and the horizontal scaling coefficients generated by the CPU.

The first computation circuit may vertically scale the first pixels using the vertical scaling coefficients instead of the first coefficients and output the vertically scaled pixels. The second computation circuit may horizontally scale the vertically scaled pixels using the horizontal scaling coefficients instead of the second coefficients and output the horizontally scaled pixels. The number of the first pixels may be different from the number of the first coefficients and the number of the vertically scaled pixels may be different from the number of the second coefficients.

According to other embodiments of the disclosed subject matter, there is provided a system on chip including a memory configured to store an image including first pixels and an application processor connected to the memory. The application processor includes a DMA controller configured to read the first pixels from the memory and a reconfigurable hardware scaler.

The reconfigurable hardware scaler may include dedicated circuits configured to perform different scaling techniques, respectively and a shared circuit configured to be shared by the dedicated circuits. One of the different scaling techniques may be performed by one of the dedicated circuits and the shared circuit.

Each of the dedicated circuits may include first coefficient calculators each configured to generate coefficients corresponding to one of the different scaling techniques. The shared circuit may include a first computation circuit configured to vertically scale first pixels using first coefficients, which are generated by a first coefficient calculator selected from among the first coefficient calculators, and to output vertically scaled pixels. Each of the dedicated circuits may further include second coefficient calculators each configured to generate coefficients corresponding to one of the different scaling techniques. The shared circuit may further include a second computation circuit configured to horizontally scale the vertically scaled pixels using second coefficients, which are generated by a second coefficient calculator selected from among the second coefficient calculators, and to output horizontally scaled pixels.

According to further embodiments of the disclosed subject matter, there is provided a data processing system including a system on chip and a display. The system on chip includes a memory configured to store an image including first pixels and an application processor connected to the memory. The application processor includes a DMA controller configured to read the first pixels from the memory and a reconfigurable hardware scaler.

The reconfigurable hardware scaler includes dedicated circuits configured to perform different scaling techniques, respectively and a shared circuit configured to be shared by the dedicated circuits. One of the different scaling techniques may be performed by one of the dedicated circuits and the shared circuit.

Each of the dedicated circuits may include first coefficient calculators each configured to generate coefficients corresponding to one of the different scaling techniques. The shared circuit may include a first computation circuit configured to vertically scale first pixels using first coefficients, which are generated by a first coefficient calculator selected from among the first coefficient calculators, and to output vertically scaled pixels.

Each of the dedicated circuits may further include second coefficient calculators each configured to generate coefficients corresponding to one of the different scaling techniques. The shared circuit may further include a second computation circuit configured to horizontally scale the vertically scaled pixels using second coefficients, which are generated by a second coefficient calculator selected from among the second coefficient calculators, and to output horizontally scaled pixels.

BRIEF DESCRIPTION OF THE DRAWINGS

The above and other features and advantages of the disclosed subject matter will become more apparent by describing in detail exemplary embodiments thereof with reference to the attached drawings in which:

FIG. 8 is a diagram of an embodiment of coefficients generated by coefficient calculators illustrated in FIG. 6 according to some embodiments of the disclosed subject matter;

DETAILED DESCRIPTION OF THE EMBODIMENTS

Figure 1:
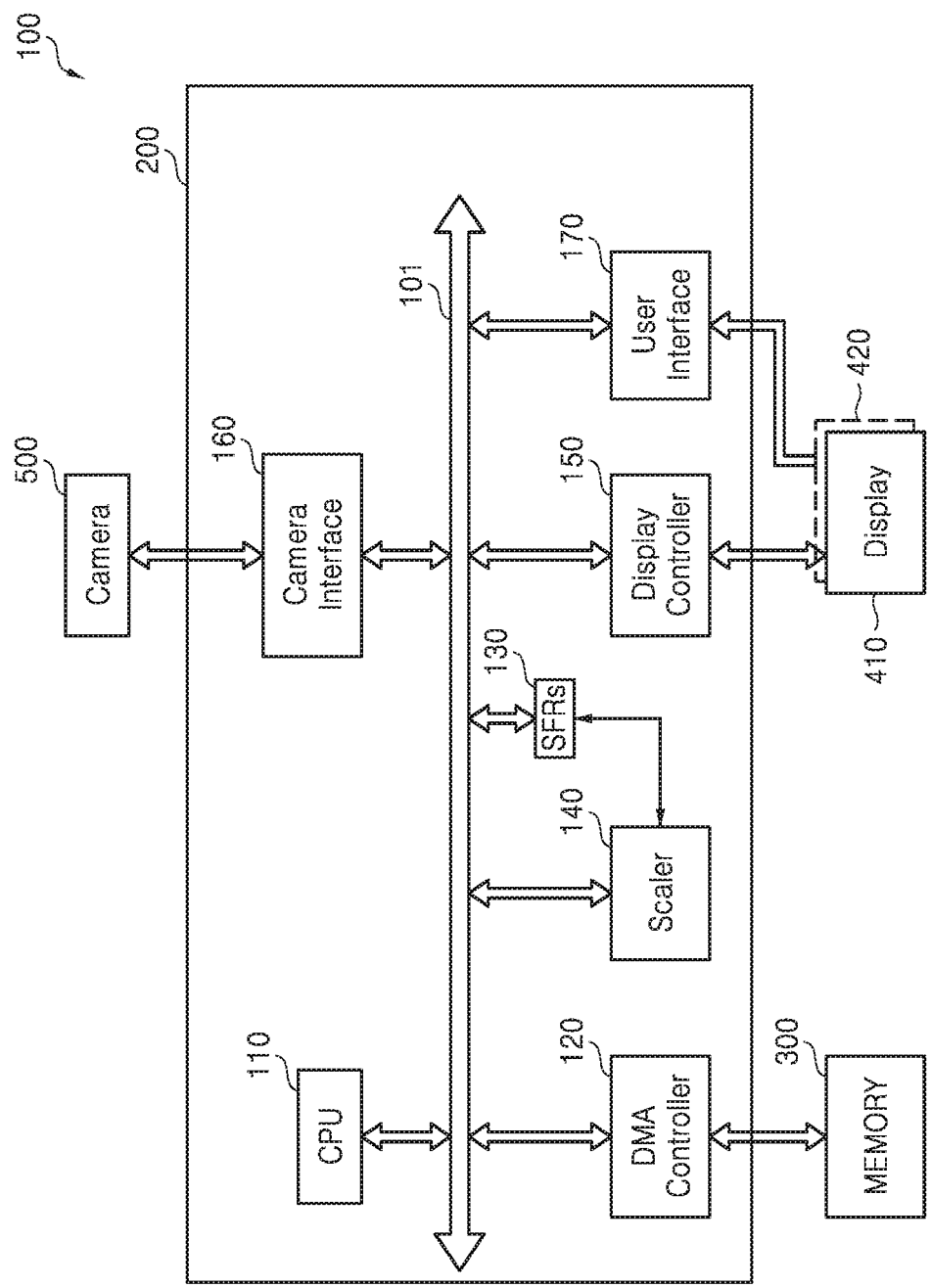
FIG. 1 is a schematic block diagram of a data processing system according to some embodiments of the disclosed subject matter.

The disclosed subject matter now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a schematic block diagram of a data processing system 100 according to some embodiments of the disclosed subject matter. Referring to FIG. 1, the data processing system 100 may include a host 200, a memory 300, a display 410, and a camera 500. For example, the memory 300 and/or the camera 500 may function as a source of images to be processed by a scaler 140.

The data processing system 100 may include a personal computer (PC), a desktop computer, a laptop computer, a workstation computer, or a portable computing device. The portable computing device may be a cellular phone, a smart phone, a tablet PC, a personal digital assistant (PDA), an enterprise digital assistant (EDA), a digital still camera, a digital video camera, a portable multimedia player (PMP), a multimedia device, a personal navigation device or portable navigation device (PND), a handheld game console, a mobile internet device (MID), a wearable device (or a wearable computer), an internet of things (IoT) device, an internet of everything (IoE) device, a drone, or an e-book. It is understood that the above are merely a few illustrative examples to which the disclosed subject matter is not limited.

The host 200 may be implemented in an integrated circuit (IC), a mother board, a system on chip (SoC), an application processor (AP), or a mobile AP. When the host 200 is implemented in a SoC, the host 200 and the memory 300 may be integrated into the SoC. In the illustrated embodiment, the host 200 may be implemented as an AP or a mobile AP.

The host 200 may include one or more of: a central processing unit (CPU) 110, a direct memory access (DMA) controller 120, a data storage device 130, the scaler 140, a display controller 150, a camera interface 160, and/or a user interface 170. The host 200 may also include a modem or network interface (not shown) which may receive images and/or video transmitted from other devices. In such an embodiment, an image output from the modem network interface may be transmitted to the scaler 140 via the memory 300, be directly transmitted to the scaler 140, or transmitted to the scaler 140 via another path.

The CPU 110 may control the components 120, 130, 140, 150, 160, and 170 via at least one bus 101 and/or at least one direct communication path. The DMA controller 120 may read or fetch an image to be processed by the scaler 140 according to the control of the CPU 110. In some embodiments, the DMA controller 120 may allow the scaler 140 to access the memory 300 independently of the CPU 110.

The CPU 110 may store data for the operation of the scaler 140 in the data storage device 130. The data storage device 130 may include a register (e.g., a special function registers (SFRs), flip-flop, static random access memory (SRAM), etc.). For example, the CPU 110 may store data for the operation of the scaler 140 in the data storage device 130 based on user data (or user input) transmitted via the user interface 170.

The scaler 140 may include a reconfigurable hardware scaler that can support one of a plurality of different scaling techniques or schemes depending upon a pattern of pixels to be processed. In the illustrated embodiment, the pixels included in an image (or image data, still image data, moving image data, stereoscopic data, etc.) may include data in an RGB data format, YUV data format, or YCbCr data format. It is understood that the above are merely a few illustrative examples to which the disclosed subject matter is not limited.

In various embodiments, the scaler 140, which is dynamically reconfigurable so as to support one of a plurality of different scaling techniques, may vertically and/or horizontally scale pixels using the one of a plurality of different scaling techniques. The scaler 140 may output the vertically and/or horizontally scaled pixels. Accordingly, the reconfigurable scaler 140 may include shared circuits that perform each of different scaling techniques in common and/or one or more dedicated circuits which perform each of the respective scaling techniques exclusively.

The display controller 150 may transmit, to the display 410, an image corresponding to the scaled pixels. The display controller 150 may also transmit an image processed by the camera interface 160 to the display 410. The camera interface 160 may receive data from the camera 500 and process the data. For example, the camera interface 160 may receive data using camera serial interface (CSI). It is understood that the above is merely one illustrative example to which the disclosed subject matter is not limited.

The user interface 170 may process user data (or user input) received from a user input device 420 and may transmit the processed data to the bus 101. In some embodiments, the user input device 420 may be implemented as, for example, a touch screen panel or a voice recognition device. It is understood that the above are merely a few illustrative examples to which the disclosed subject matter is not limited.

The memory 300 may include volatile memory, non-volatile memory, or a combination thereof. The volatile memory may include random access memory (RAM), dynamic RAM (DRAM), or static RAM (SRAM). The non-volatile memory may include electrically erasable programmable read-only memory (EEPROM), flash memory, magnetic RAM (MRAM), spin-transfer torque MRAM, ferroelectric RAM (FeRAM), phase-change RAM (PRAM), or resistive RAM (RRAM). The memory 300 may be implemented as a hard disk drive (HDD), a smart card, a secure digital (SD) card, a multimedia card (MMC), an embedded MMC (eMMC), a perfect page NAND (PPN), a universal flash storage (UFS), a solid state drive (SSD), or an embedded SSD (eSSD). It is understood that the above are merely a few illustrative examples to which the disclosed subject matter is not limited.

The display 410 may display an image under the control of the display controller 150. The display 410 may include a flat panel display such as a thin film transistor-liquid crystal display (TFT-LCD), a light emitting diode (LED) display, an organic LED (OLED) display, an active matrix OLED (AMOLED) display, a flexible display, or a transparent display. It is understood that the above are merely a few illustrative examples to which the disclosed subject matter is not limited.

In various embodiments, the camera 500 may be implemented as a camera module including a complementary metal-oxide semiconductor (CMOS) image sensor. It is understood that the above is merely one illustrative example to which the disclosed subject matter is not limited.

Figure 2:
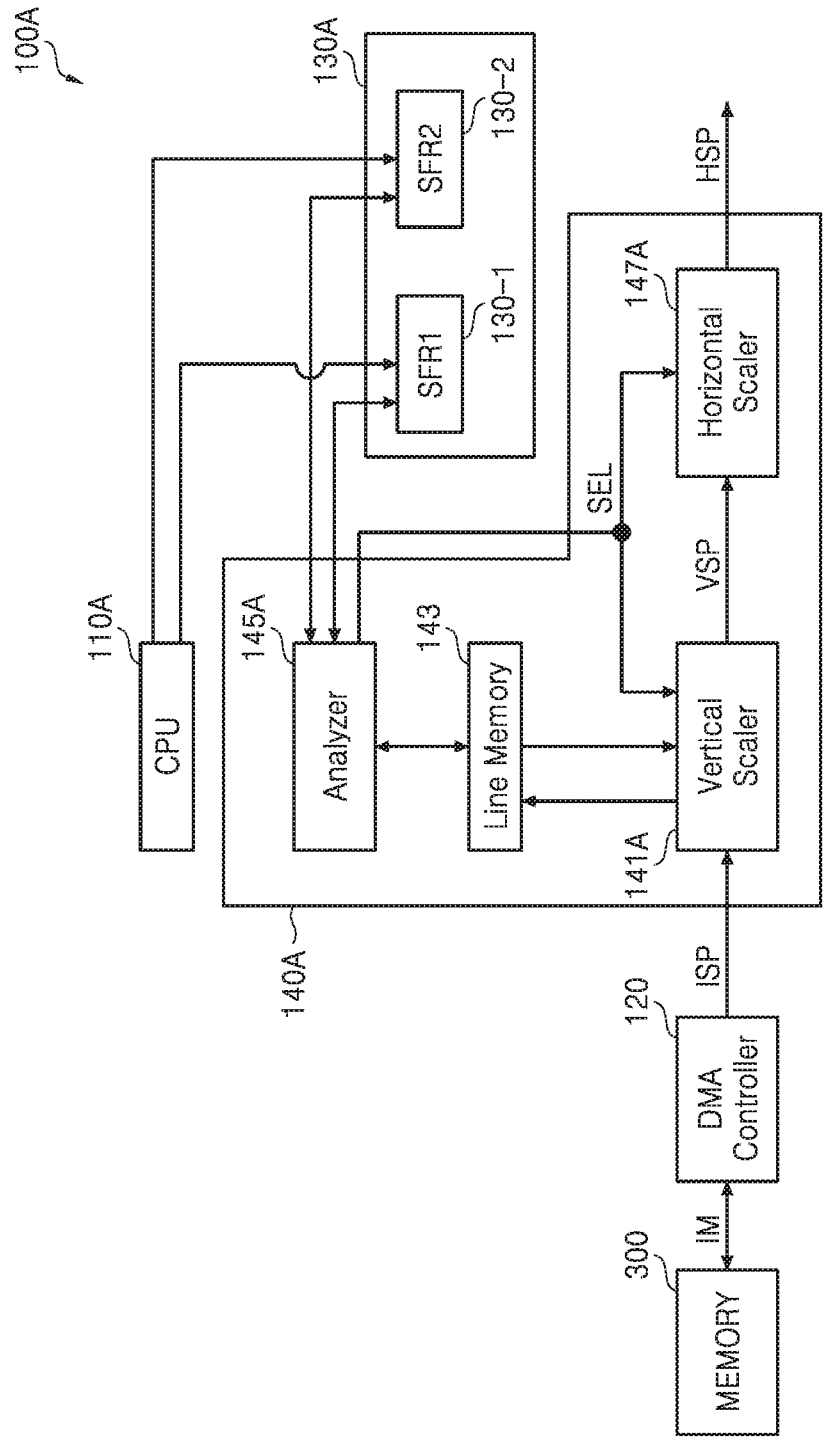
FIG. 2 is a block diagram of a hardware scaler and a data storage device according to some embodiments of the disclosed subject matter.

FIG. 2 is a block diagram of a hardware scaler 140A and a data storage device 130A according to some embodiments of the disclosed subject matter.

Referring to FIG. 2, the hardware scaler 140A may include a vertical scaler 141A, a line memory 143, an analyzer 145A, and a horizontal scaler 147A. For convenience' sake in the description, a CPU 110A, the DMA controller 120, and the memory 300 are illustrated together with the hardware scaler 140A in FIG. 2. The CPU 110A is an example of the CPU 110 illustrated in FIG. 1, the data storage device 130A is an example of the data storage device 130 illustrated in FIG. 1, and the hardware scaler 140A is an example of the scaler 140 illustrated in FIG. 1.

In various embodiments, part of the vertical scaler 141A may be used as a shared circuit and the remaining part of the vertical scaler 141A may be used as a dedicated circuit. In some embodiments, the line memory 143 and the analyzer 145A may be used as shared circuits.

The data storage device 130A may include a first data storage device 130-1 and a second data storage device 130-2. The first data storage device 130-1 may be implemented as a first SFR 130-1 and the second data storage device 130-2 may be implemented as a second SFR 130-2. It is understood that the above is merely one illustrative example to which the disclosed subject matter is not limited.

The CPU 110A may store data about a plurality of scaling techniques (or types of scaling techniques), which can be employed by the hardware scaler 140A, in the first SFR 130-1. In addition, the CPU 110A may store, in the second SFR 130-2, data that indicates whether or not the scaler 140A is to employ or operate in an adaptive change mode or operate in a no-change mode. In various other embodiments, the CPU 110A may store data via other storage mediums.

Figures 3, 4, 5:
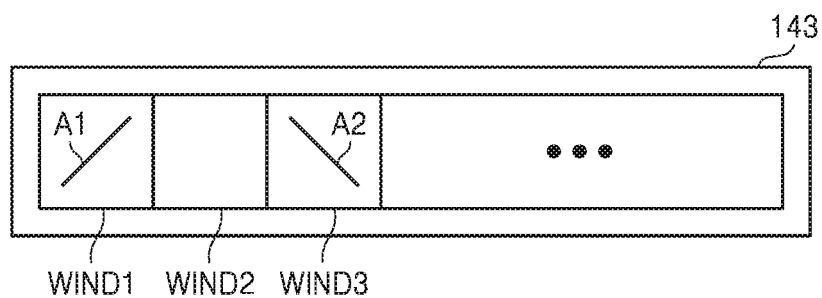
FIG. 3 is a diagram of an embodiment of data stored in a first data storage device illustrated in FIG. 2.
FIG. 4 is a diagram of an embodiment of data stored in a second data storage device illustrated in FIG. 2.
FIG. 5 is a diagram of an embodiment of an image stored in a line memory illustrated in FIG. 2 according to some embodiments of the disclosed subject matter.

FIG. 3 is a diagram of data stored in the first SFR 130-1 illustrated in FIG. 2. FIG. 4 is a diagram of data stored in the second SFR 130-2 illustrated in FIG. 2. For example, when the data set by the CPU 110A in the second SFR 130-2 (illustrated by FIG. 4) is "0", the analyzer 145A may output a selection signal (SEL) instructing (or indicating) the scalers 141A and 147A to use a scaling technique corresponding to the data set in the first SFR 130-1 (illustrated by FIG. 3). In various embodiments, the selection signal SEL may include one or more signals or bits.

In the illustrated embodiment, the scaler 140A may be configured to employ one of four possible scaling techniques (e.g., technique 1, technique 2, technique 3, technique 4, etc.). The CPU 110A may determine which technique is to be employed or used for scaling. The CPU 110A may store this determination in the SFR 130-1, as illustrated by FIG. 3. Likewise, the CPU 110A may indicate, via the SFR 130-2, that one of the fixed techniques is to be employed.

In another embodiment, an adaptive technique may be employed (e.g., an SFR 130-2 value of 1). Such an adaptive technique is described in more detail below.

Figure 6:
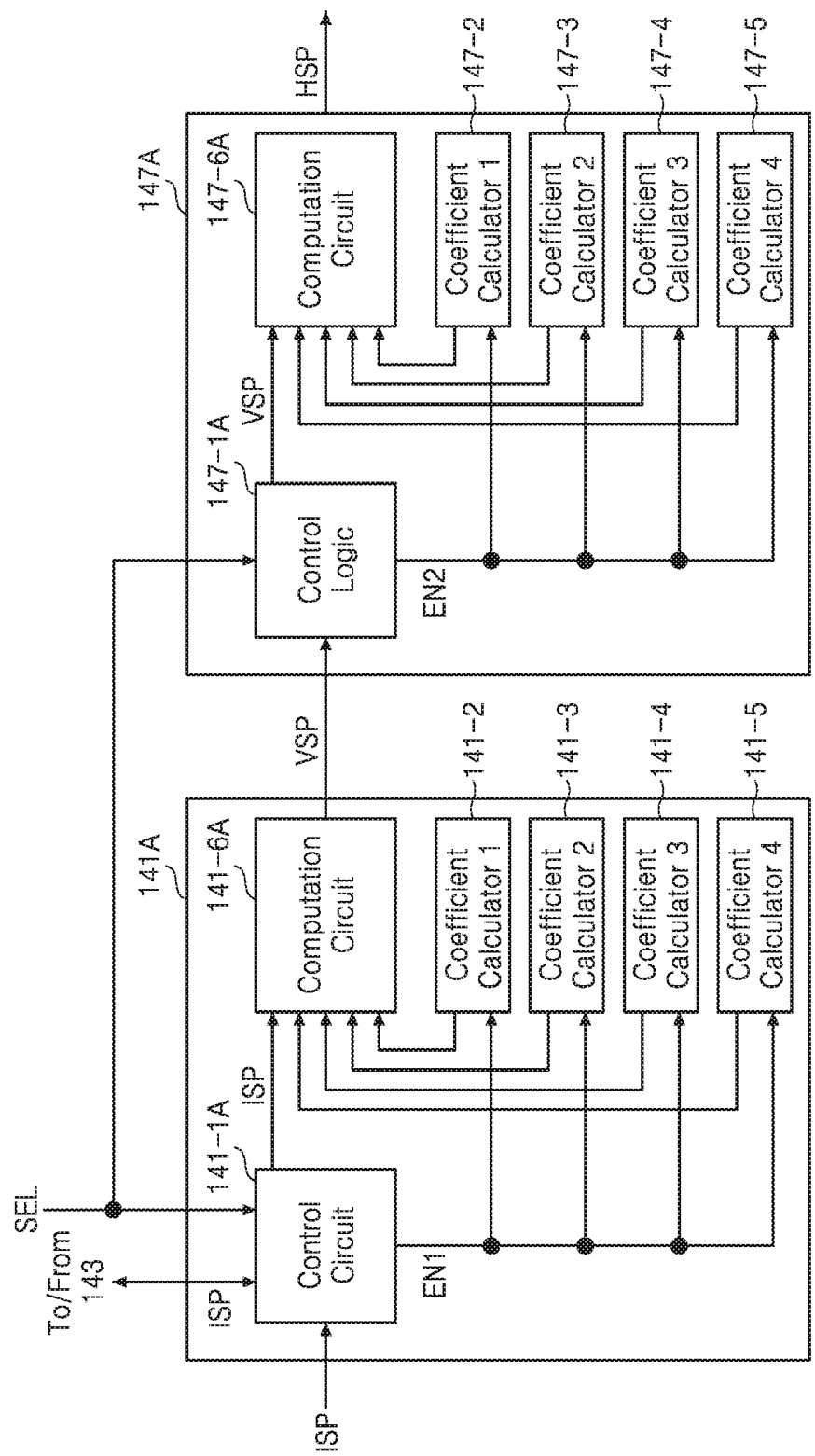
FIG. 6 is a detailed block diagram of an embodiment of a vertical scaler and a horizontal scaler illustrated in FIG. 2.

FIG. 6 is a detailed block diagram of the vertical scaler 141A and the horizontal scaler 147A illustrated in FIG. 2. For convenience' sake in the description, it is assumed that four types of data can be stored in the first SFR 130-1, the vertical scaler 141A may include four coefficient calculators 141-2 through 141-5, and the horizontal scaler 147A may include four coefficient calculators 147-2 through 147-5 in the embodiments illustrated in FIGS. 3 and 4. However, the disclosed subject matter is not restricted to the type of data that can be stored in the first SFR 130-1, the number of coefficient calculators included in the vertical scaler 141A, and/or the number of coefficient calculators included in the horizontal scaler 147A.

Each pair of the coefficient calculators 141-2 and 147-2, 141-3 and 147-3, 141-4 and 147-4, and 141-5 and 147-5 may be used as a dedicated circuit for performing a corresponding technique. For example, when data stored in the first SFR 130-1 is "00" and data stored in the second SFR 130-2 is "0", the scalers 141A and 147A scale pixels vertically and horizontally using coefficients generated by the first coefficient calculators 141-2 and 147-2 illustrated in FIG. 6. In such an embodiment, the hardware scaler 140A scales the pixels vertically and horizontally using a first scaling technique during a single frame. The first coefficient calculators 141-2 and 147-2 may form a dedicated circuit to perform the first scaling technique.

In the illustrated embodiment, when the data stored in the first SFR 130-1 is "01" and the data stored in the second SFR 130-2 is "0", the scalers 141A and 147A scale pixels vertically and horizontally using coefficients generated by the second coefficient calculators 141-3 and 147-3 illustrated in FIG. 6. In such an embodiment, the hardware scaler 140A scales the pixels vertically and horizontally using a second scaling technique during a single frame. The second coefficient calculators 141-3 and 147-3 may form a dedicated circuit to perform the second scaling technique.

In the illustrated embodiment, when the data stored in the first SFR 130-1 is "10" and the data stored in the second SFR 130-2 is "0", the scalers 141A and 147A scale pixels vertically and horizontally using coefficients generated by the third coefficient calculators 141-4 and 147-4 illustrated in FIG. 6. In such an embodiment, the hardware scaler 140A scales the pixels vertically and horizontally using a third scaling technique during a single frame. The third coefficient calculators 141-4 and 147-4 may form a dedicated circuit to perform the third scaling technique.

In the illustrated embodiment, when the data stored in the first SFR 130-1 is "11" and the data stored in the second SFR 130-2 is "0", the scalers 141A and 147A scale pixels vertically and horizontally using coefficients generated by the fourth coefficient calculators 141-5 and 147-5 illustrated in FIG. 6. In such an embodiment, the hardware scaler 140A scales the pixels vertically and horizontally using a fourth scaling technique during a single frame. The fourth coefficient calculators 141-5 and 147-5 may form a dedicated circuit to perform the fourth scaling technique. As described above, when data stored in the second SFR 130-2 is "0", the analyzer 145A used as a shared circuit does not analyze the pattern of pixels stored in the line memory 143.

However, when the data stored in the second SFR 130-2 is "1", the analyzer 145A analyzes the pattern of pixels stored in the line memory 143 and generates the selection signal SEL according to the analysis result. For example, when the data stored in the first SFR 130-1 are "00", "01", "10", and "11" and the data stored in the second SFR 130-2 is "1", the analyzer 145A analyzes the pattern of pixels stored in the line memory 143 and generates the selection signal SEL according to the analysis result. Accordingly, each of the scalers 141A and 147A selects one among four coefficient calculators 141-2 through 141-5 or 147-2 through 147-5 based on the selection signal SEL.

Hereinafter, the operation of a part 100A of the data processing system 100 will be described in detail with reference to FIGS. 1, 2, 3, 4, 5, 6, and 7 on the assumption that data stored in the first SFR 130-1 equals "00", "01", "10", or "11 and data stored in the second SFR 130-2 is "1". While the examples herein discuss a SFR 130-1 of 2-bits or 4 techniques, it is understood that the above are merely a few illustrative examples to which the disclosed subject matter is not limited.

Referring to FIG. 2, the DMA controller 120 may read an image IM from the memory 300, store the image IM in an internal buffer (or memory), and transmit pixels ISP to be processed by the hardware scaler 140A. Alternatively, the DMA controller 120 may read the image IM from the memory 300 and transmit pixels ISP corresponding to the image IM to the hardware scaler 140A. In various embodiments, the DMA controller 120 may transmit the pixels ISP corresponding to the image IM to the hardware scaler 140A on the fly or as needed by the hardware scaler 140A.

In the illustrated embodiment, the vertical scaler 141A transmits the pixels ISP to the line memory 143. In one embodiment, illustrated by FIG. 6, a first control circuit 141-1A included in the vertical scaler 141A may transmit the pixels ISP to the line memory 143.

The line memory 143 may store pixels corresponding to a plurality of lines. The analyzer 145A determines whether to analyze the pattern of the pixels stored in the line memory 143 based on the data stored in the first SFR 130-1 and the data stored in the second SFR 130-2.

Since the data stored in the second SFR 130-2 is "1" according to the above-described assumption, the analyzer 145A analyzes the pattern of the pixels stored in the line memory 143. The analyzer 145A generates the selection signal SEL based on the analysis result and the data stored in the first SFR 130-1.

For example, when the pattern of the pixels is analyzed as a first pattern and if use (or usage) data for the first coefficient calculator 141-2, which performs the first scaling technique corresponding to the first pattern, is set in the first SFR 130-1; the analyzer 145A generates the selection signal SEL instructing to enable the first coefficient calculator 141-2.

If the pattern of the pixels is analyzed as a second pattern different from the first pattern and when use (or usage) data for the second coefficient calculator 141-3, which performs the second scaling technique corresponding to the second pattern, is set in the first SFR 130-1; the analyzer 145A generates the selection signal SEL instructing to enable the second coefficient calculator 141-3.

If the pattern of the pixels is analyzed as a third pattern different from the second pattern and when use data for the third coefficient calculator 141-4, which performs the third scaling technique corresponding to the third pattern, is set in the first SFR 130-1; the analyzer 145A generates the selection signal SEL instructing to enable the third coefficient calculator 141-4.

If the pattern of the pixels is analyzed as a fourth pattern different from the third pattern and when use data for the fourth coefficient calculator 141-5, which performs the fourth scaling technique corresponding to the fourth pattern, is set in the first SFR 130-1; the analyzer 145A generates the selection signal SEL instructing to enable the fourth coefficient calculator 141-5.

In some embodiments, if the analyzer 145A outputs the selection signal SEL instructing the first control circuit 141-1A to enable the first coefficient calculator 141-2, the first control circuit 141-1A reads the pixels ISP from the line memory 143 and transmits the pixels ISP to a first computation circuit 141-6A. In such an embodiment, both of the circuits 141-1A and 141-6A may be commonly shared between the various techniques.

The first control circuit 141-1A transmits an enable signal EN1 to the coefficient calculators 141-2 through 141-5. In one embodiment, the enable signal EN1 may indicate that only the first coefficient calculator 141-2 is to be enabled. Accordingly, the coefficient calculators 141-3 through 141-5 may be disabled. The enabled first coefficient calculator 141-2 may generate coefficients C1 through C8 for the first scaling technique. The first computation circuit 141-6A receives the pixels ISP and the coefficients C1 through C8, vertically scales the pixels ISP using the coefficients C1 through C8, and transmits vertically scaled pixels VSP to the horizontal scaler 147A.

The analyzer 145A may then output the selection signal SEL to a second control circuit 147-1A. This selection signal SEL may enable the first coefficient calculator 147-2. The second control circuit 147-1A may transmit the vertically scaled pixels VSP to a second computation circuit 147-6A. Again, both of the circuits 147-1A and 147-6A may be used as shared circuits.

The second control circuit 147-1A transmits an enable signal EN2 to the coefficient calculators 147-2 through 147-5. In the illustrated embodiment, the enable signal EN2 may enable the first coefficient calculator 147-2. Accordingly, among the coefficient calculators 147-2 through 147-5 only the first coefficient calculator 147-2 may be enabled. In such an embodiment, the first coefficient calculator 147-2 generates the coefficients C1 through C8 for the first scaling technique. The second computation circuit 147-6A receives the vertically scaled pixels VSP and the coefficients C1 through C8, horizontally scales the vertically scaled pixels VSP using the coefficients C1 through C8, and transmits horizontally scaled pixels HSP.

Figure 7:
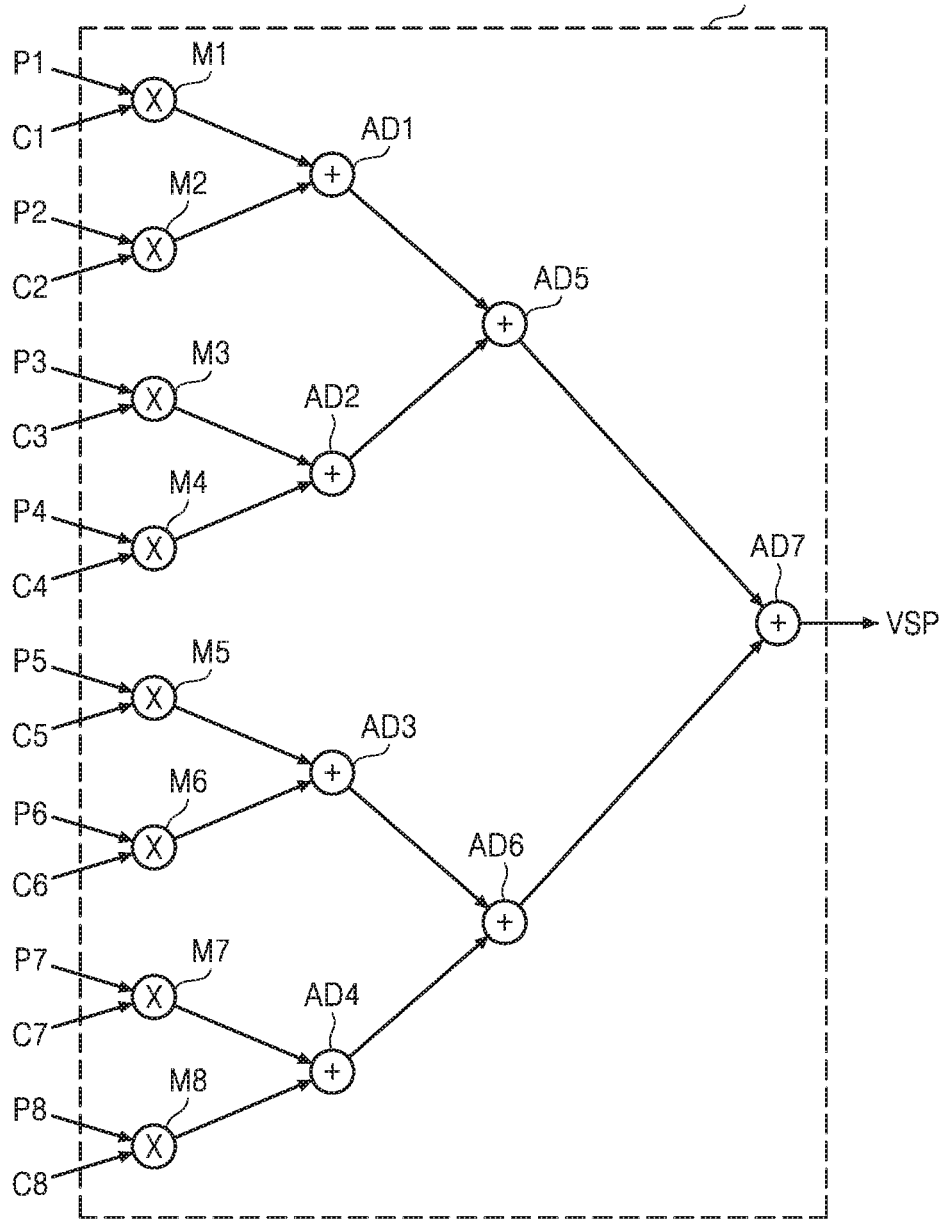
FIG. 7 is a conceptual diagram of an embodiment of a computation circuit illustrated in FIG. 6.

FIG. 7 is a conceptual diagram of the first computation circuit 141-6A illustrated in FIG. 6. It is assumed that the first computation circuit 141-6A is an 8-tap filter, as shown in FIG. 7. The first computation circuit 141-6A includes eight multipliers M1 through M8 and seven adders AD1 through AD7. The first computation circuit 141-6A illustrated in FIG. 7 is just an example and the disclosed subject matter is not restricted to this example.

FIG. 8 is a diagram of the coefficients C1 through C8 generated by the coefficient calculators 141-2 through 141-5 illustrated in FIG. 6 according to some embodiments of the disclosed subject matter. It is assumed that the first coefficient calculator 141-2 generates eight coefficients C1 through C8 for the first scaling technique, the second coefficient calculator 141-3 generates four coefficients C1, C3, C5, and C7 for the second scaling technique, the third coefficient calculator 141-4 generates four coefficients C1 through C4 for the third scaling technique, and the fourth coefficient calculator 141-5 generates four coefficients C5 through C8 for the fourth scaling technique. In addition, it is assumed that the second coefficient calculator 141-3 generates four coefficients C2, C4, C6, and C8 determined by default, the third coefficient calculator 141-4 generates four coefficients C5 through C8 determined by default, and the fourth coefficient calculator 141-5 generates four coefficients C1 through C4 determined by default. It is understood that the above are merely a few illustrative examples to which the disclosed subject matter is not limited.

Although the structure and operations of the second computation circuit 147-6A may be the same as or different from those of the first computation circuit 141-6A, it is assumed that the structure and operations of the second computation circuit 147-6A are substantially the same as those of the first computation circuit 141-6A for convenience' sake in the description.

Although the structure and operations of the coefficient calculator 147-2 may be the same as or different from those of the corresponding coefficient calculator 141-2, it is assumed that the structure and operations of the coefficient calculator 147-2 are substantially the same as those of the coefficient calculator 141-2 for convenience' sake in the description. Although the structure and operations of the coefficient calculator 147-3 may be the same as or different from those of the corresponding coefficient calculator 141-3, it is assumed that the structure and operations of the coefficient calculator 147-3 are substantially the same as those of the coefficient calculator 141-3 for convenience' sake in the description. Although the structure and operations of the coefficient calculator 147-4 may be the same as or different from those of the corresponding coefficient calculator 141-4, it is assumed that the structure and operations of the coefficient calculator 147-4 are substantially the same as those of the coefficient calculator 141-4 for convenience' sake in the description. Although the structure and operations of the coefficient calculator 147-5 may be the same as or different from those of the corresponding coefficient calculator 141-5, it is assumed that the structure and operations of the coefficient calculator 147-5 are substantially the same as those of the coefficient calculator 141-5 for convenience' sake in the description.

In some embodiments, the control circuits 141-1A and 147-1A and the computation circuits 141-6A and 147-6A may be included in a shared circuit. At least some of the components M1 through M8 and AD1 through AD7 included in each of the computation circuits 141-6A and 147-6A may not be used depending upon the selected scaling technique.

The coefficient calculators 141-2 and 147-2 are included in a first dedicated circuit for performing the first scaling technique. The coefficient calculators 141-3 and 147-3 are included in a second dedicated circuit for performing the second scaling technique. The coefficient calculators 141-4 and 147-4 are included in a third dedicated circuit for performing the third scaling technique. The coefficient calculators 141-5 and 147-5 are included in a fourth dedicated circuit for performing the fourth scaling technique.

In other embodiments, when the analyzer 145A outputs, to the first control circuit 141-1A, the selection signal SEL that instructs the enablement of the fourth coefficient calculator 141-5, the first control circuit 141-1A reads the pixels ISP from the line memory 143 and transmits the pixels ISP to the first computation circuit 141-6A.

The first control circuit 141-1A transmits the enable signal EN1 to the coefficient calculators 141-2 through 141-5. However, in such an embodiment, the enable signal EN1 indicates that the fourth coefficient calculator 141-5 is to be enabled. Accordingly, the fourth coefficient calculator 141-5 generates the coefficients C5 through C8 for the fourth scaling technique. The first computation circuit 141-6A receives the pixels ISP and the coefficients C5 through C8, vertically scales the pixels ISP using the coefficients C5 through C8, and transmits the vertically scaled pixels VSP to the horizontal scaler 147A.

When the analyzer 145A outputs the selection signal SEL instructing the enablement of the fourth coefficient calculator 147-5 to the second control circuit 147-1A, the second control circuit 147-1A transmits the vertically scaled pixels VSP to the second computation circuit 147-6A.

The second control circuit 147-1A transmits the enable signal EN2 to the coefficient calculators 147-2 through 147-5. Accordingly, only the fourth coefficient calculator 147-5 is enabled. The fourth coefficient calculator 147-5 generates the coefficients C5 through C8 for the fourth scaling technique. The second computation circuit 147-6A receives the vertically scaled pixels VSP and the coefficients C5 through C8, horizontally scales the vertically scaled pixels VSP using the coefficients C5 through C8, and transmits the horizontally scaled pixels HSP.

FIG. 5 is a diagram of an image stored in the line memory 143 illustrated in FIG. 2 according to some embodiments of the disclosed subject matter. It is assumed that a fifth scaling technique is a bi-cubic scaling technique and a sixth scaling technique is a poly-phase filtered scaling technique for convenience' sake in the description of the pattern of pixels illustrated in FIG. 5.

The bi-cubic scaling technique shows satisfactory performance for graphics data. However, the bi-cubic scaling technique does not show satisfactory performance for video data since it does not satisfactorily process a diagonal portion. The poly-phase filtered scaling technique satisfactorily processes a diagonal portion but does not appropriately process a boundary portion. The poly-phase filtered scaling technique shows satisfactory performance for video data but does not show satisfactory performance for graphics data.

As described above, different types of scaling techniques have different advantages and disadvantages. Accordingly, the analyzer 145A may analyze the pattern of pixels stored in the line memory 143 and generate the selection signal SEL according to the analysis result.

Figure 9:
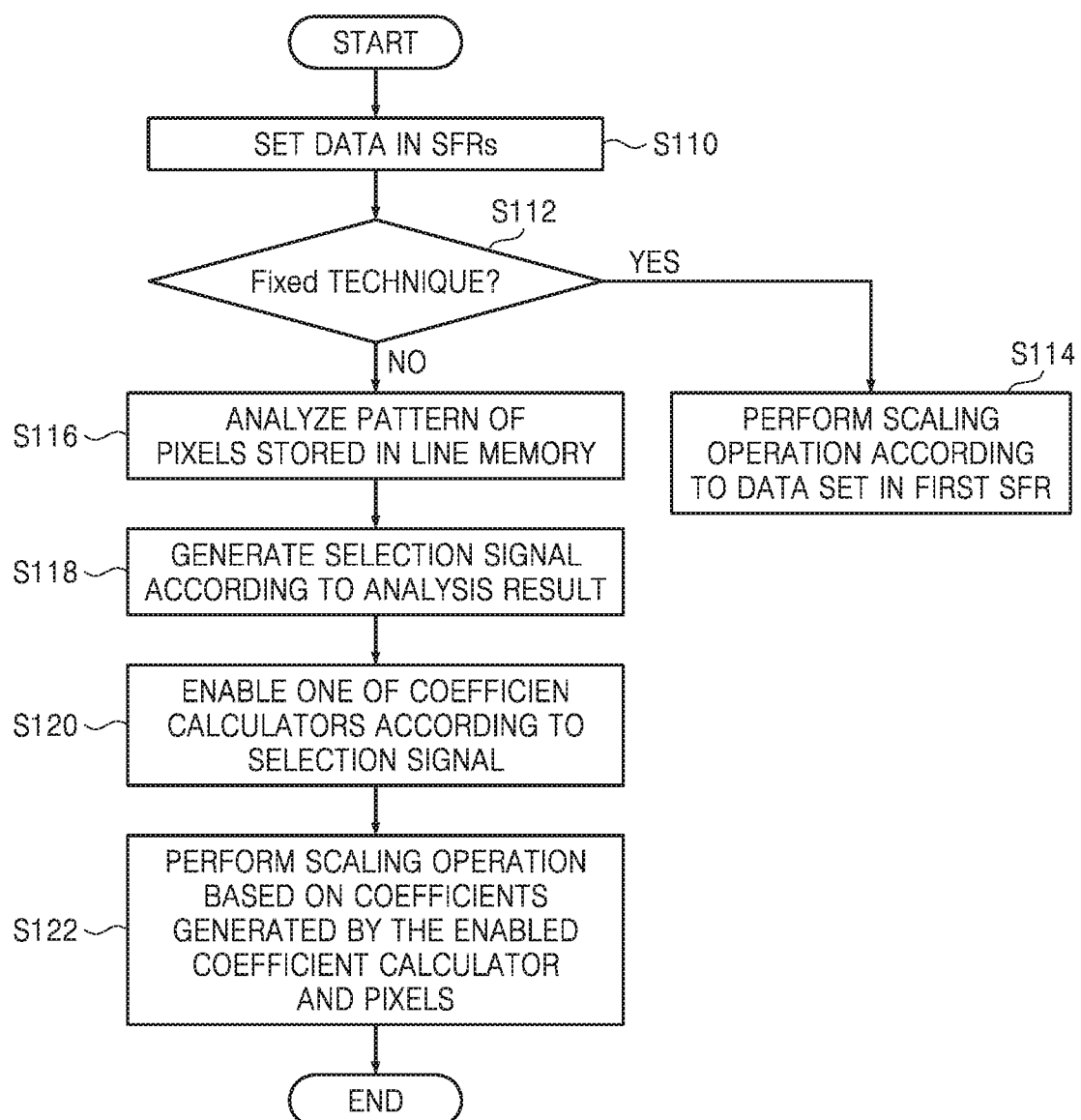
FIG. 9 is a flowchart of an embodiment of the operation of the data processing system according to some embodiments of the disclosed subject matter.

FIG. 9 is a flowchart of the operation of the data processing system 100A according to some embodiments of the disclosed subject matter. Referring to FIGS. 1 through 9, the CPU 110A in the data processing system 100A sets data in the SFRs 130-1 and 130-2 in operation S110.

The analyzer 145A reads the data from each of the SFRs 130-1 and 130-2 and determines adaptive change or no-change based on the data stored in the second SFR 130-2 in operation S112. In various embodiments, when the data stored in the second SFR 130-2 is "0", as shown in FIG. 4, the analyzer 145A generates the selection signal SEL corresponding to the data stored in the first SFR 130-1 without analyzing the pattern of pixels stored in the line memory 143.

In some embodiments, when the data stored in the second SFR 130-2 is "0" and the data stored in the first SFR 130-1 is "00", the analyzer 145A transmits the selection signal SEL instructing to enable the coefficient calculators 141-2 and 147-2 to the control circuits 141-1A and 147-1A. The control circuits 141-1A and 147-1A respectively generate the enable signals EN1 and EN2 for enabling the coefficient calculators 141-2 and 147-2, respectively.

Accordingly, the vertical scaler 141A vertically scales the pixels ISP using the coefficients C1 through C8 generated by the coefficient calculator 141-2. In other words, the vertical scaler 141A vertically scales the pixels ISP using the first scaling technique.

The horizontal scaler 147A horizontally scales the vertically scaled pixels VSP using the coefficients C1 through C8 generated by the coefficient calculator 147-2. In other words, the horizontal scaler 147A horizontally scales the vertically scaled pixels VSP using the first scaling technique. Consequently, the hardware scaler 140A vertically scales the pixels ISP using the first scaling technique and horizontally scales the vertically scaled pixels VSP using the first scaling technique in operation S114.

In other embodiments, when the data stored in the second SFR 130-2 is "0" and the data stored in the first SFR 130-1 is "10", the analyzer 145A transmits the selection signal SEL instructing to enable the coefficient calculators 141-4 and 147-4 to the control circuits 141-1A and 147-1A. The control circuits 141-1A and 147-1A respectively generate the enable signals EN1 and EN2 for enabling the coefficient calculators 141-4 and 147-4, respectively.

Accordingly, the vertical scaler 141A vertically scales the pixels ISP using the coefficients C1 through C4 generated by the coefficient calculator 141-4. In other words, the vertical scaler 141A vertically scales the pixels ISP using the third scaling technique.

The horizontal scaler 147A horizontally scales the vertically scaled pixels VSP using the coefficients C1 through C4 generated by the coefficient calculator 147-4. In other words, the horizontal scaler 147A horizontally scales the vertically scaled pixels VSP using the third scaling technique. Consequently, the hardware scaler 140A vertically scales the pixels ISP using the third scaling technique and horizontally scales the vertically scaled pixels VSP using the third scaling technique in operation S114.

However, when the data stored in the second SFR 130-2 is "1" and the data stored in the first SFR 130-1 are "00" and "01", the analyzer 145A analyzes the pattern of pixels stored in the line memory 143 in operation S116. When the analyzed pattern is the second pattern, the analyzer 145A transmits the selection signal SEL instructing to enable the coefficient calculators 141-3 and 147-3 to the control circuits 141-1A and 147-1A based on the analyzed pattern and the data "00" and "01" stored in the first SFR 130-1 in operation S118.

The control circuits 141-1A and 147-1A respectively generate the signals EN1 and EN2 for enabling the coefficient calculators 141-3 and 147-3, respectively, in operation S120. Accordingly, the vertical scaler 141A vertically scales the pixels ISP using the coefficients C1, C3, C5, and C7 generated by the coefficient calculator 141-3. In other words, the vertical scaler 141A vertically scales the pixels ISP using the second scaling technique.

The horizontal scaler 147A horizontally scales the vertically scaled pixels VSP using the coefficients C1, C3, C5, and C7 generated by the coefficient calculator 147-3. In other words, the horizontal scaler 147A horizontally scales the vertically scaled pixels VSP using the second scaling technique. Consequently, the hardware scaler 140A vertically scales the pixels ISP using the second scaling technique and horizontally scales the vertically scaled pixels VSP using the second scaling technique in operation S122.

Figure 10:
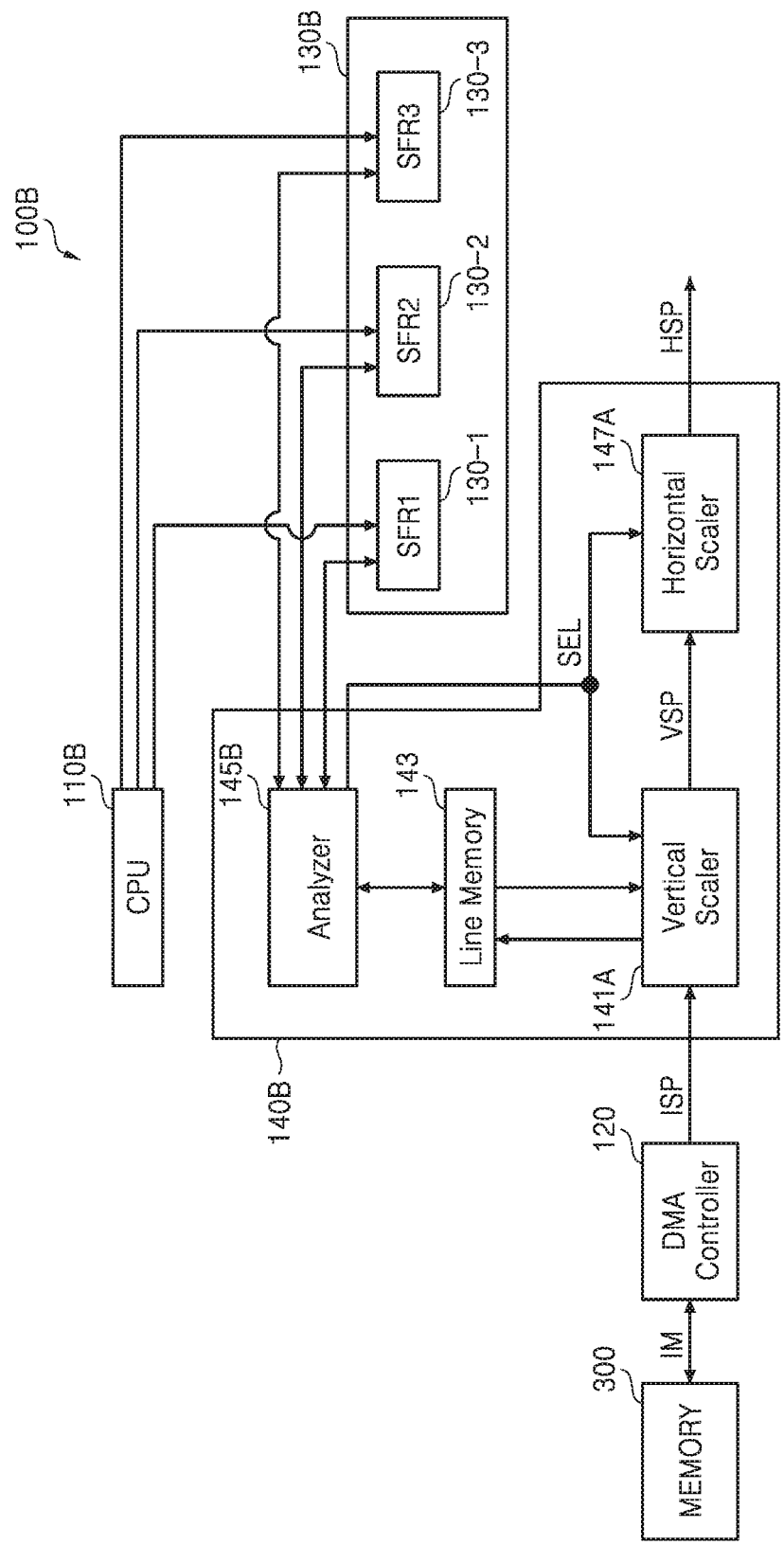
FIG. 10 is a block diagram of an embodiment of a hardware scaler and a data storage device according to other embodiments of the disclosed subject matter.
Figure 11:
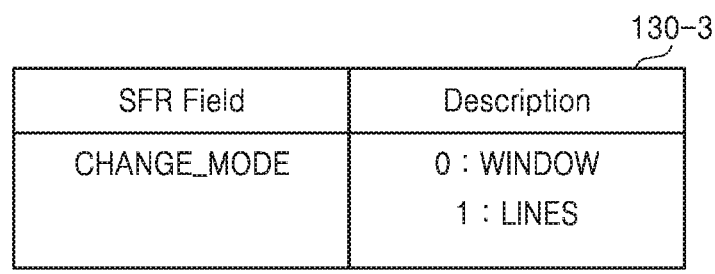
FIG. 11 is a diagram of an embodiment of data stored in a third data storage device illustrated in FIG. 10.

FIG. 10 is a block diagram of a hardware scaler 140B and a data storage device 130B according to other embodiments of the disclosed subject matter. FIG. 11 is a diagram of data stored in a third data storage device 130-3 illustrated in FIG. 10.

Referring to FIG. 10, the hardware scaler 140B includes a vertical scaler 141A, a line memory 143, an analyzer 145B, and a horizontal scaler 147A. For convenience' sake in the description, a CPU 110B, the DMA controller 120, the data storage device 130B, and the memory 300 are illustrated together with the hardware scaler 140B in FIG. 10. The CPU 110B is another example of the CPU 110 illustrated in FIG. 1, the data storage device 130B is another example of the data storage device 130 illustrated in FIG. 1, and the hardware scaler 140B is another example of the scaler 140 illustrated in FIG. 1.

The data storage device 130B includes the first data storage device 130-1, the second data storage device 130-2, and the third data storage device 130-3. The third data storage device 130-3 may be implemented as a third SFR 130-3.

As shown in FIG. 11, data set by the CPU 110B in the third SFR 130-3 may, in one embodiment, indicate a "change mode". For example, the data set in the third SFR 130-3 may refer to the number (or size, shape, etc.) of pixels to be interpreted or analyzed. When the data set in the third SFR 130-3 is "0", the analyzer 145B may analyze the pattern of pixels in each window (or portion defined by the value in the third SFR 130-3) and may use a scaling technique for each window according to the analysis result. A window may include a group of m*m pixels, where "m" is a natural number or integer of at least 2. It is understood that the above is merely one illustrative example to which the disclosed subject matter is not limited.

In the illustrated embodiment, when the data set in the third SFR 130-3 is "1", the analyzer 145B may analyze the pattern of pixels in units of lines and may change a scaling technique based upon the units of lines according to the analysis result. For example, the analyzer 145B may analyze the pattern of pixels per N (which is a natural number of at least 2, e.g., 4, etc.) lines and may change a scaling technique every N lines according to the analysis result. In other words, some of pixels included in N lines may be included in a window.

For example, when the resolution of the image IM is 1920*1080 and the number of pixels included in N lines is 4*1080, a window may include 4*4 pixels. Accordingly, the number of pixels analyzed by the analyzer 145B may be equal to the number of pixels stored in the line memory 143 when pixels are analyzed in units of lines or may be less than the number of pixels stored in the line memory 143 when pixels are analyzed per window. Accordingly, when the pixels ISP are stored in the line memory 143, the number of pixels to be analyzed by the analyzer 145B may be equal to or less than the number of the pixels ISP.

The analyzer 145B may determine whether to perform an adaptive change and, if so, whether to perform the adaptive change on each window or in units of lines based on data stored in the first SFR 130-1, data stored in the second SFR 130-2, and data stored in the third SFR 130-3. When the analyzer 145B performs an adaptive change, the analyzer 145B may analyze the pattern of pixels in each window or in units of lines.

Figure 12:
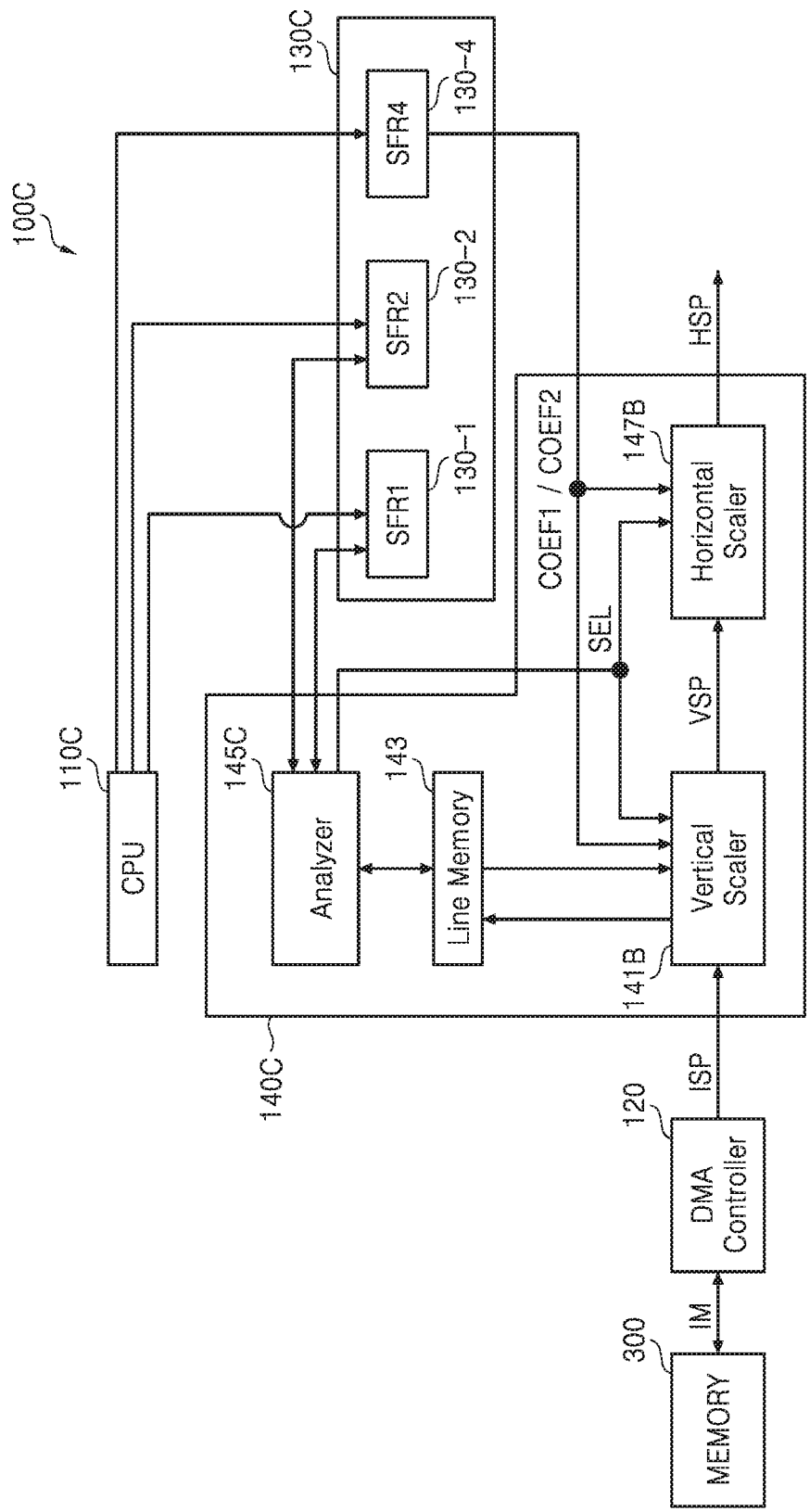
FIG. 12 is a block diagram of an embodiment of a hardware scaler and a data storage device according to still other embodiments of the disclosed subject matter.
Figure 13:
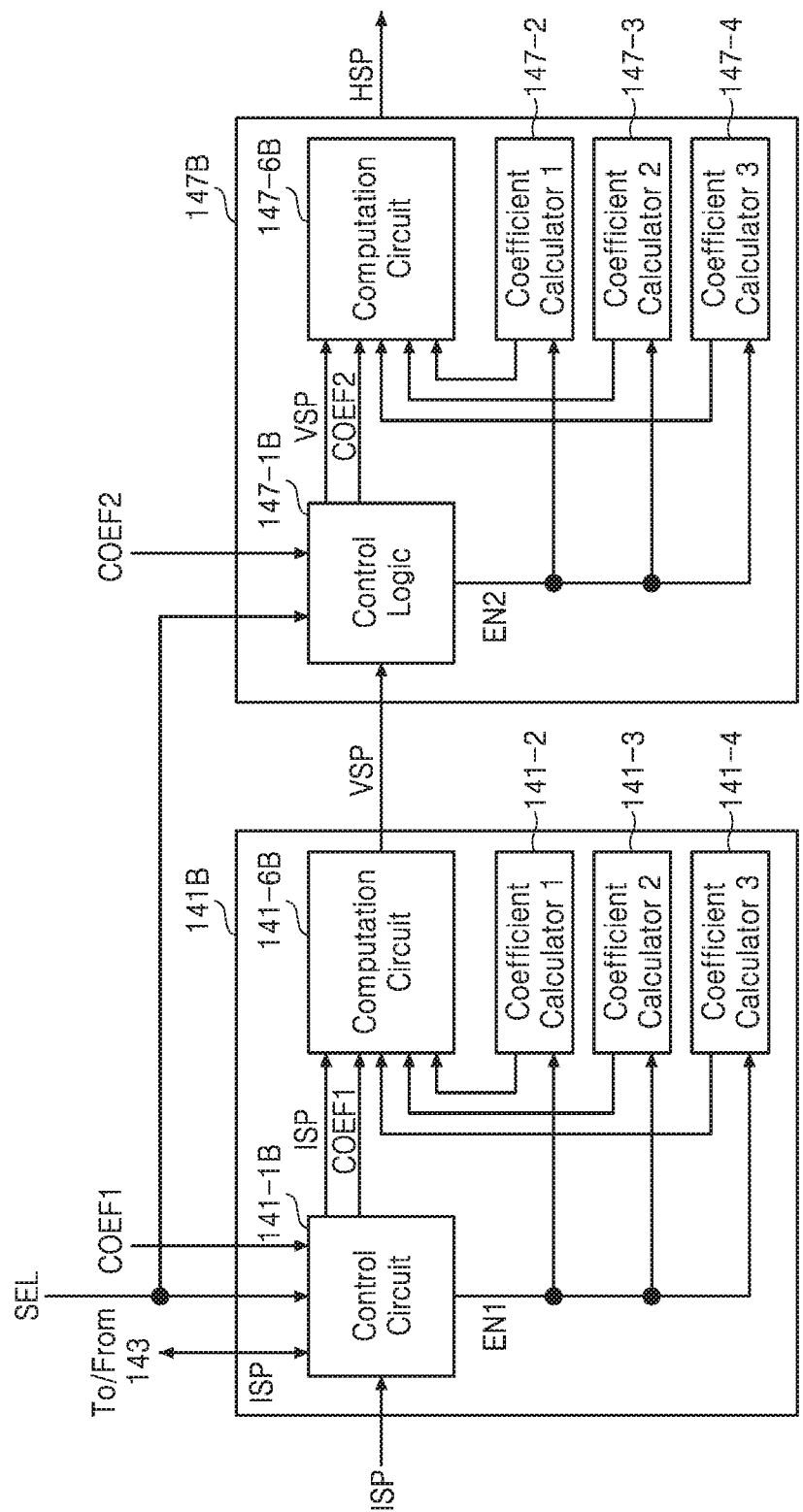
FIG. 13 is a detailed block diagram of an embodiment of a vertical scaler and a horizontal scaler illustrated in FIG. 12.

FIG. 12 is a block diagram of a hardware scaler 140C and a data storage device 130C according to still other embodiments of the disclosed subject matter. FIG. 13 is a detailed block diagram of a vertical scaler 141B and a horizontal scaler 147B illustrated in FIG. 12.

Referring to FIG. 12, the hardware scaler 140C includes a vertical scaler 141B, a line memory 143, an analyzer 145C, and a horizontal scaler 147B. For convenience' sake in the description, a CPU 110C, the DMA controller 120, the data storage device 130C, and the memory 300 are illustrated together with the hardware scaler 140C in FIG. 12. The CPU 110C is still another example of the CPU 110 illustrated in FIG. 1, the data storage device 130C is still another example of the data storage device 130 illustrated in FIG. 1, and the hardware scaler 140C is still another example of the scaler 140 illustrated in FIG. 1.

The data storage device 130C includes the first data storage device 130-1, the second data storage device 130-2, and a fourth data storage device 130-4. The fourth data storage device 130-4 may be implemented as a fourth SFR 130-4. The fourth SFR 130-4 may store coefficients (e.g., vertical scaling coefficients and horizontal scaling coefficients) generated by the CPU 110C. In the illustrated embodiment, the data storage device 130C may only include three total data storage devices (devices 130-1, 130-2, and 130-4, etc.), but the data storage device 130-4 may be referred to as a fourth data storage device so as not to confuse it with the third data storage device 130-3 of FIG. 10.

The analyzer 145C may determine whether to perform an adaptive change and a type of scaling technique that can support the adaptive change based on data stored in the first SFR 130-1 and data stored in the second SFR 130-2. When the analyzer 145C performs an adaptive change, the analyzer 145C may analyze the pattern of pixels stored in the line memory 143.

In various embodiments, the first SFR 130-1 may include data that dictates the performance of the sixth scaling technique (e.g., a poly-phase filtered scaling technique). In such an embodiment, the vertical scaler 141B and the horizontal scaler 147B perform the sixth scaling technique in response to the selection signal SEL.

Referring to FIGS. 3 through 5, FIGS. 7 and 8 and FIGS. 12 and 13, when the pattern analyzed by the analyzer 145C includes diagonal portions A1 and A2, the analyzer 145C transmits the selection signal SEL to control circuits 141-1B and 147-1B. Accordingly, the vertical scaler 141B and the horizontal scaler 147B perform the sixth scaling technique in response to the selection signal SEL. The control circuit 141-1B generates the signal EN1 for disabling the coefficient calculators 141-2 through 141-4 and the control circuit 147-1B generates the signal EN2 for disabling the coefficient calculators 147-2 through 147-4.

The first control circuit 141-1B transmits first coefficients (e.g., vertical scaling coefficients) COEF1 stored in the fourth SFR 130-4 and the pixels ISP to a first computation circuit 141-6B in response to the selection signal SEL. The first computation circuit 141-6B vertically scales the pixels ISP using the first coefficients COEF1 and transmits the vertically scaled pixels VSP to the second control circuit 147-1B.

The second control circuit 147-1B transmits second coefficients (e.g., horizontal scaling coefficients) COEF2 stored in the fourth SFR 130-4 and the vertically scaled pixels VSP to a second computation circuit 147-6B in response to the selection signal SEL. The second computation circuit 147-6B horizontally scales the vertically scaled pixels VSP using the second coefficients COEF2 and outputs the horizontally scaled pixels HSP.

The number of the first coefficients COEF1 and the number of the second coefficients COEF2 may be the same as or different from each other. The number of the first coefficients COEF1 and the number of the pixels ISP may be the same as or different from each other. The number of the second coefficients COEF2 and the number of the vertically scaled pixels VSP may be the same as or different from each other.

The first control circuit 141-1B may generate the enable signal EN1 in response to the selection signal SEL. The first control circuit 141-1B may also transmit the pixels ISP to the first computation circuit 141-6B in response to the selection signal SEL or may transmit the pixels ISP and the first coefficients COEF1 to the first computation circuit 141-6B in response to the selection signal SEL. The first computation circuit 141-6B may vertically scale the pixels ISP using coefficients calculated by one of the coefficient calculators 141-2 through 141-4 or the first coefficients COEF1 and may output the vertically scaled pixels VSP.

The second control circuit 147-1B may generate the enable signal EN2 in response to the selection signal SEL. The second control circuit 147-1B may also transmit the vertically scaled pixels VSP to the second computation circuit 147-6B in response to the selection signal SEL or may transmit the vertically scaled pixels VSP and the second coefficients COEF2 to the second computation circuit 147-6B in response to the selection signal SEL. The second computation circuit 147-6B may horizontally scale the vertically scaled pixels VSP using coefficients calculated by one of the coefficient calculators 147-2 through 147-4 or the second coefficients COEF2 and may output the horizontally scaled pixels HSP.

Figure 14:
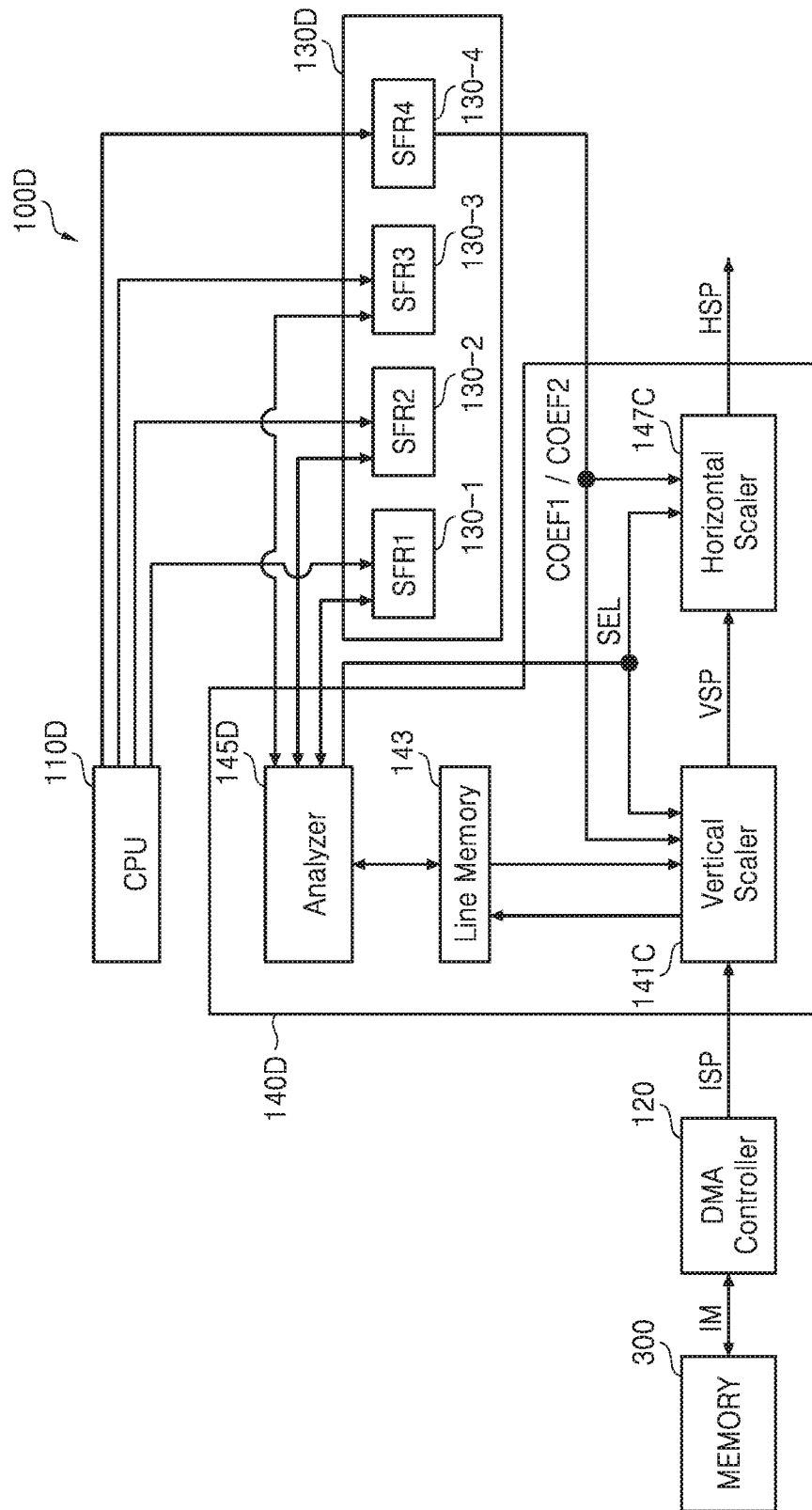
FIG. 14 is a block diagram of an embodiment of a hardware scaler and a data storage device according to further embodiments of the disclosed subject matter.
Figure 15:
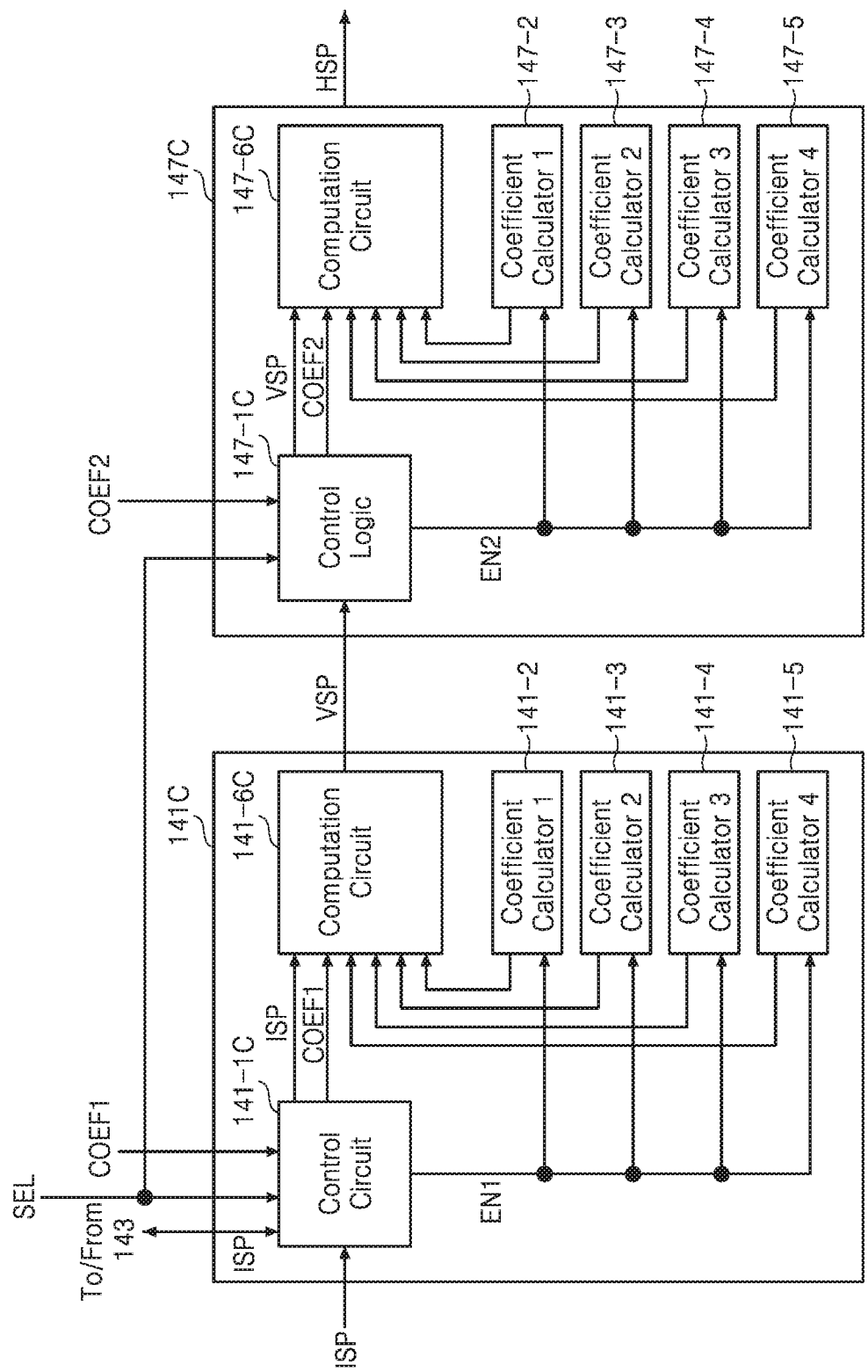
FIG. 15 is a detailed block diagram of an embodiment of a vertical scaler and a horizontal scaler illustrated in FIG. 14.

FIG. 14 is a block diagram of a hardware scaler 140D and a data storage device 130D according to further embodiments of the disclosed subject matter. FIG. 15 is a detailed block diagram of a vertical scaler 141C and a horizontal scaler 147C illustrated in FIG. 14.

Referring to FIG. 14, the hardware scaler 140D includes a vertical scaler 141C, a line memory 143, an analyzer 145D, and a horizontal scaler 147C. For convenience' sake in the description, a CPU 110D, the DMA controller 120, the data storage device 130D, and the memory 300 are illustrated together with the hardware scaler 140D in FIG. 14. The CPU 110D is yet another example of the CPU 110 illustrated in FIG. 1, the data storage device 130D is yet another example of the data storage device 130 illustrated in FIG. 1, and the hardware scaler 140D is yet another example of the scaler 140 illustrated in FIG. 1.

The data storage device 130D includes the first data storage device 130-1, the second data storage device 130-2, the third data storage device 130-3, and the fourth data storage device 130-4.

Each of the scalers 141C and 147C may scale the pixels ISP or VSP using a scaling technique selected based on data stored in each of the data storage devices 130-1 through 130-4.

The structure and operations of the hardware scaler 140D illustrated in FIG. 14 will be understood referring to the structure and operations of the hardware scalers 140A, 140B, and 140C described with reference to FIGS. 2 through 13. Thus, detailed descriptions of the structure and operations of the hardware scaler 140D will be omitted. The operations of control circuits 141-1C and 147-1C are substantially similar to those of the control circuits 141-1A and 147-1A and the operations of computation circuits 141-6C and 147-6C are substantially similar to those of the computation circuits 141-6A and 147-6A.

The first control circuit 141-1C may generate the enable signal EN1 in response to the selection signal SEL. The first control circuit 141-1C may also transmit the pixels ISP to the first computation circuit 141-6C in response to the selection signal SEL or may transmit the pixels ISP and the first coefficients COEF1 to the first computation circuit 141-6C in response to the selection signal SEL. The first computation circuit 141-6C may vertically scale the pixels ISP using coefficients calculated by one of the coefficient calculators 141-2 through 141-5 or the first coefficients COEF1 and may output the vertically scaled pixels VSP.

The second control circuit 147-1C may generate the enable signal EN2 in response to the selection signal SEL. The second control circuit 147-1C may also transmit the vertically scaled pixels VSP to the second computation circuit 147-6C in response to the selection signal SEL or may transmit the vertically scaled pixels VSP and the second coefficients COEF2 to the second computation circuit 147-6C in response to the selection signal SEL. The second computation circuit 147-6C may horizontally scale the vertically scaled pixels VSP using coefficients calculated by one of the coefficient calculators 147-2 through 147-5 or the second coefficients COEF2 and may output the horizontally scaled pixels HSP.

As described above, according to some embodiments of the disclosed subject matter, a reconfigurable hardware scaler analyzes the pattern of pixels and adaptively performs one of different scaling techniques according to the analysis result.

While the disclosed subject matter has been particularly shown and described with reference to exemplary embodiments thereof, it will be understood by those of ordinary skill in the art that various changes in forms and details may be made therein without departing from the spirit and scope of the disclosed subject matter as defined by the following claims.

The invention claimed is:

1. A scaler device, comprising:
   a memory configured to store first pixels;
   a first scaler configured to vertically scale first pixels and output the vertically scaled first pixels;
   a second scaler configured to horizontally scale the vertically scaled first pixels; and
   an analyzer configured to analyze a pattern of the first pixels based on first data in a special function register and to generate a first selection signal based on the pattern of the first pixels, and to generate a second selection signal based on second data in the special function register,
   wherein the first scaler includes a first control circuit, a first computation circuit, a first coefficient calculator and a second coefficient calculator, and
   wherein the first control circuit receives the first pixels from the memory and transmits the first pixels to the first computation circuit, the first control circuit enables one of the first coefficient calculator and the second coefficient calculator based on the first selection signal, and the enabled one among the first coefficient calculator and the second coefficient calculator generates first coefficients.

2. The scaler device of claim 1, wherein the second scaler includes a second control circuit, a second computation circuit, a third coefficient calculator and a fourth coefficient calculator.

3. The scaler device of claim 1, wherein the first computation circuit receives the first pixels and the first coefficients, and scales the first pixels using the first coefficients.

4. The scaler device of claim 2, wherein the first coefficient calculator performs a first scaling mode corresponding to the pattern of the first pixels, and
   the second coefficient calculator performs a second scaling mode corresponding to the pattern of the first pixels.

5. The scaler device of claim 4, wherein the first control circuit, the first computation circuit, the memory and the analyzer are shared with the first scaling mode and the second scaling mode that is different from the first scaling mode.

6. The scaler device of claim 4, wherein the third coefficient calculator performs the first scaling mode, and
   the fourth coefficient calculator performs the second scaling mode.

7. The scaler device of claim 2, wherein the second control circuit enables one of the third coefficient calculator and the fourth coefficient calculator based on the first selection signal, and
   the enabled one among the third coefficient calculator and the fourth coefficient calculator generates second coefficients.

8. The scaler device of claim 7, wherein the second computation circuit receives the vertically scaled first pixels and the second coefficients, and further scales the vertically scaled first pixels using the second coefficients.

9. A scaler device, comprising:
   a scaling selection register configured to select one among a first scaling mode and a second scaling mode;
   a memory configured to store first pixels;
   a first scaler configured to vertically scale first pixels and output the vertically scaled first pixels;
   a second scaler configured to horizontally scale the vertically scaled first pixels; and
   an analyzer configured to analyze a pattern of the first pixels based on the first scaling mode and to generate a first selection signal based on the pattern of the first pixels, and to generate a second selection signal based on the second scaling mode,
   wherein the first scaler includes a first control circuit, a first computation circuit, a first coefficient calculator and a second coefficient calculator, and
   wherein the first control circuit receives the first pixels from the memory and transmits the first pixels to the first computation circuit, the first control circuit enables one of the first coefficient calculator and the second coefficient calculator based on the first selection signal, and the enabled one among the first coefficient calculator and the second coefficient calculator generates first coefficients.

10. The scaler device of claim 9, wherein the second scaler includes a second control circuit, a second computation circuit, a third coefficient calculator and a fourth coefficient calculator.

11. The scaler device of claim 9, wherein the first computation circuit receives the first pixels and the first coefficients, and scales the first pixels using the first coefficients.

12. The scaler device of claim 10, wherein the first coefficient calculator performs a first scaling mode corresponding to the pattern of the first pixels, and
   the second coefficient calculator performs a second scaling mode corresponding to the pattern of the first pixels.

13. The scaler device of claim 12, wherein the first control circuit, the first computation circuit, the memory and the analyzer are shared with the first scaling mode and the second scaling mode that is different from the first scaling mode.

14. The scaler device of claim 12, wherein the third coefficient calculator performs the first scaling mode, and
   the fourth coefficient calculator performs the second scaling mode.

15. The scaler device of claim 10, wherein the second control circuit enables one of the third coefficient calculator and the fourth coefficient calculator based on the first selection signal, and
   the enabled one among the third coefficient calculator and the fourth coefficient calculator generates second coefficients.

16. The scaler device of claim 15, wherein the second computation circuit receives the vertically scaled first pixels and the second coefficients, and further scales the vertically scaled first pixels using the second coefficients.

* * * * *